United States Patent [19]

Smith

[11] 4,115,365

[45] Sep. 19, 1978

[54] PROCESS FOR PREPARING AMINOMETHYL DIARYL COMPOUND RESINS

[75] Inventor: Harry A. Smith, Midland, Mich.

[73] Assignee: The Dow Chemical Company, Midland, Mich.

[21] Appl. No.: 856,443

[22] Filed: Dec. 1, 1977

Related U.S. Application Data

[63] Continuation-in-part of Ser. No. 802,690, Jun. 2, 1977, abandoned, which is a continuation-in-part of Ser. No. 662,392, Mar. 1, 1976, abandoned.

[51] Int. Cl.$^2$ .................. C08G 12/42; C08G 14/06
[52] U.S. Cl. ............................ 528/132; 260/831; 528/143; 528/144; 528/153; 528/231; 528/242; 528/232; 528/249; 528/251
[58] Field of Search ............... 260/52, 67 S, 67 A, 260/51.5

[56] References Cited

U.S. PATENT DOCUMENTS 3,367,914  2/1968  Herbert .................. 260/51.5
3,914,194  10/1975  Smith .................... 260/52

OTHER PUBLICATIONS

Chem. Abstracts, vol. 76, 1972, 47505c, Masuko et al.
Chem. Abstracts, vol. 66, 1967, 19472q, Aftsergut.
Chem. Abstracts, vol. 77, 1972, 140781v, Kartseva et al.
Chem. Abstracts, vol. 81, 1974, 38239v, Kartseva et al.
Chem. Abstracts, vol. 81, 1974, 136824b, Khadzhistoyanova.
Chem. Abstracts, vol. 81, 1974, 122960f, Masuko.

Primary Examiner—Howard E. Schain

[57] ABSTRACT

A method for the preparation of soluble, fusible, aminomethyl diaryl compound resins in the absence of halomethylation or halomethylated materials, which method comprises (a) refluxing a mixture of diaryl compound, an aldehyde, a saturated monocarboxylic acid, and a small amount of a strong acid catalyst to form an aldehyde-diaryl resin, (b) stripping off excess monocarboxylic acid under vacuum, and then (c) adding at least about 1 mole of a primary or secondary amine containing at least one additional nontertiary amino group per reactive group on the aldehyde-diaryl resin.

8 Claims, No Drawings

PROCESS FOR PREPARING AMINOMETHYL DIARYL COMPOUND RESINS

BACKGROUND OF THE INVENTION

This application is a continuation-in-part of application Ser. No. 802,690, filed June 2, 1977, now abandoned, which is, in turn, a continuation-in-part of Ser. No. 662,392, filed Mar. 1, 1976 (now abandoned).

It is known that aminomethyl-diaryl compound resins are useful in laminates, moldings and protective coatings and as curing agents for epoxy resins and the like. Among the epoxy resins which may be cured with these compounds are the polyglycidyl derivatives of (1) dihydric phenols; (2) alkyl-substituted dihydric phenols; (3) halogen-substituted dihydric phenols; (4) polyoxyalkylene glycols; and (5) the condensation products of formaldehyde and phenol, alkyl-substituted phenols or halogen-substituted phenols, and the like. It is also known that the usual route to the obtention of these resinous materials is by way of ammoniation of halomethyl diaryl compounds such as chloromethyl diphenyl ether. This particular route, however, requires halomethylation of the diaryl compound prior to undergoing ammoniation. The present invention now provides a way to aminomethyl substitute diaryl compounds which alleviates the necessity of halomethylation prior to ammoniation.

SUMMARY OF THE INVENTION

It has been discovered that aminomethyl-diaryl compound resins can be prepared without undergoing chloromethylation prior to ammoniation by the method which comprises:

(a) heating, at a temperature of from about 75° C. to about reflux, a mixture consisting of an aldehyde, a diaryl compound, a saturated monocarboxylic acid having from about 1 to about 10 carbon atoms and a strong acid catalyst wherein the molar ratio of the diaryl compound:aldehyde ranges from about 1:1 to about 1:10, the molar ratio of the diaryl compound:monocarboxylic acid ranges from about 1:1 to about 1:9, and the catalyst is employed in a molar ratio of the diaryl compound-:catalyst from about 1:0.001 to about 1:0.3 to form an aldehyde-diaryl resin having a molecular weight of at least about 1000 to about 3000, (b) stripping off the excess monocarboxylic acid under vacuum, and then (c) adding at least about 1 mole of a primary or secondary amine containing at least one additional nontertiary amino group per reactive group on the aldehyde-diaryl resin to form a soluble, fusible resin.

DESCRIPTION OF THE PREFERRED EMBODIMENTS

The aminomethyl diaryl compound resins of the present invention are generally prepared by first obtaining an aldehyde-diaryl resin. This is done by, first, reacting an aldehyde with a diaryl compound in the presence of a saturated carboxylic acid and a strong acid catalyst at a temperature of from about 75° C. to about reflux (about 108° C.) and preferably from about 100° C. to about reflux, and then stripping off the excess carboxylic acid under vacuum. These resins are disclosed in commonly-owned, copending continuation-in-part application Ser. No. 585,168 filed June 9, 1975, by H. A. Smith, now abandoned, the disclosure of which is incorporated herein by reference.

The ranges of the molar ratios of the reactants used to prepare the aldehyde-diaryl resins are: diaryl compound (DAC)-aldehyde from about 1:1 to about 1:10; DAC-strong acid catalyst from about 1:0.001 to about 1:0.3, and DAC-carboxylic acid from about 1:1 to about 1:9.

Suitable diaryl type compounds that are used are diphenyl oxide, diphenyl sulfide, dibenzofuran, dibenzothiophene, and mixtures thereof. If desired, one can use the alkylated derivatives of the above diaryl compounds wherein one or both of the aromatic rings are substituted by alkyl groups of 1–10 carbons such as methyl, ethyl, propyl, etc. Likewise, the diaryl compounds can be halogenated in one or both of the aromatic rings with fluorine, chlorine, bromine, or iodine groups.

Suitable aldehydes include those aldehydes having from 1 to about 4 carbon atoms such as, for example, formaldehyde, acetaldehyde, propionaldehyde and butyraldehyde. Included in the definition of aldehyde having 1–4 carbon atoms are employed herein also are those compounds which release formaldehyde or acetaldehyde at a temperature of greater than about 90° C. Such as, for example, para-formaldehyde, 1,3,5-trioxane, paraldehyde, hexamethylene tetramine and mixtures thereof.

The aldehydes and diaryl compound (DAC) are employed in quantities preferably to provide a mole ratio of DAC:aldehyde from about 1:2 to about 1:4.

Suitable saturated carboxylic acids include acids having from 1 to 10 carbon atoms and preferably 2 to 5 carbon atoms. Exemplary of such acids are formic acid, acetic acid, propionic acid, benzoic acid, butyric acid, pentanoic acid, decanoic acid and mixtures thereof.

Suitable strong acids which are employed are those having a pKa value in water of about 0 or less including, for example, p-toluenesulfonic acid, perchloric acid, sulfuric acid, methane sulfonic acid, benzene sulfonic acid, hydrochloric acid and mixtures thereof.

The strong acid catalysts are employed in quantities preferably to provide a mole ratio of DAC:catalyst from about 1:0.05 to about 1:0.2.

The time of reaction is dependent upon the temperature of reaction and molar ratio of the reactants and quantity and catalyst employed, but such times can readily be ascertained by relatively little experimentation at the temperature desired to be employed. For a temperature of 105° C. and a molar ratio of formaldehyde:DAC:p-toluenesulfonic acid of 3:1:0.1, times of from ½ to 2½ hours are most desirable. At times longer than about 2½ hours at these conditions, crosslinking begins to occur and if such times are extended sufficiently, the product will gel in the reaction vessel, an occurence which is highly undesirable.

The resins can be conveniently thermoset or cured by heating at temperatures of from about 50° to about 250° C. and preferably from about 100° to about 200° C.

Subsequent to the preparation of the instant aldehyde-diaryl resinous compositions, ammoniation of these materials is instituted in order to obtain the resinous compositions of the present invention. This may be done by adding to such compounds any primary or secondary amine which has at least one additional amino group attached. Exemplary of such compounds is ethylene diamine, diethylenetriamine, triethylenetetramine, tetraethylenepentamine and triaminoethylamine.

These mixtures of the aldehyde-diaryl compound with the primary or secondary amine with an additional amino group exotherm at or about room temperature forming resins which are completely soluble in suitable hydrocarbon and chlorocarbon solvents and completely fusible, thereby being capable of fabrication from solution or from the melt.

The following example is illustrative of the present invention.

EXAMPLE 1

A resin was made from 30 g of diphenyl oxide, 11.6 g of 91% paraformaldehyde, 40 ml acetic acid, and 0.44 g of p-toluene sulfonic acid by refluxing the mixture 2.5 hours and then stripping off the excess acetic acid under vacuum. This resin had —$CH_2O_2CCH_3$ functional groups and a molecular weight of about 2000 and could be thermally cured at 125° C. To 5 g of this resin was added 2.9 g of tetraethylenepentamine. This is a 50% excess of tetraethylenepentamine over the —$CH_2O_2CCH_3$ groups available on the resin. The mixture exothermed at room temperature forming a soluble, fusible resin that would no longer thermally cure at 135° C. in >2 hours.

To 2 g of this aminomethyl resin was added 1 g of a 7/1 mixture of a diglycidyl ether of bisphenol A having an epoxy equivalent weight of 182 to 190 (DER 331)/-55% of a mixture of formaldehyde, methanol and water (methyl formcel). It gelled in 2½ hours at room temperature. A similar experiment with 1 g of a 2/1 DER 331/55% methyl formcel mixture gelled in three minutes at room temperature. Both systems led to clear, bubble-free castings.

The same experiments were attempted using the above epoxy/formcel mixtures with free tetraethylenepentamine. In each instance the reactions were uncontrollably fast and led to bubble-filled castings.

What is claimed is:

1. A method for the preparation of aminomethyl diaryl compound resins in the absence of halomethylation or halomethylated materials which method consists of:
    (a) heating at a temperature of from about 75° C. to about reflux, a mixture consisting of an aldehyde, a diaryl compound, a saturated monocarboxylic acid having from about 1 to about 10 carbon atoms and a strong acid catalyst wherein the molar ratio of the diaryl compound:aldehyde ranges from about 1:1 to about 1:10, the molar ratio of diaryl compound:monocarboxylic acid ranges from about 1:1 to about 1:9, and the catalyst is employed in a molar ratio of the diaryl compound:catalyst from about 1:0.001 to about 1:0.3 to form an aldehyde-diaryl resin, having a molecular weight between about 1000 and 3000,
    (b) stripping off the excess monocarboxylic acid under vacuum, and then
    (c) adding at least about 1 mole of a primary or secondary amine containing at least one additional nontertiary amino group per reactive group on the aldehyde-diaryl resin to form a soluble, fusible resin.

2. The method of claim 1 wherein said diaryl compound is selected from the group consisting of diphenyl oxide, diphenyl sulfide, dibenzofuran, dibenzothiophene, the alkylated derivatives of these diaryl compounds wherein one or both aromatic rings are substituted by alkyl groups of 1-10 carbons, the halogenated derivatives of these diaryl compounds wherein the halogenation has occurred in one or both aromatic rings and mixtures thereof.

3. The method of claim 1 wherein said aldehyde is selected from the group consisting of formaldehyde, acetaldehyde, propionaldehyde, and butyraldehyde and those compounds which release formaldehyde or acetaldehyde at a temperature of greater than about 90° C.

4. The method of claim 1 wherein said saturated monocarboxylic acid is selected from the group consisting of formic acid, acetic acid, propionic acid, benzoic acid, butyric acid, pentanoic acid, decanoic acid and mixtures thereof.

5. The method of claim 1 wherein the strong acid catalyst is selected from the group consisting of p-toluene sulfonic acid, perchloric acid, sulfuric acid, methane sulfonic acid, benzene sulfonic acid, hydrochloric acid and mixtures thereof.

6. The method of claim 1 wherein the amino compound is selected from the group consisting of ethylene diamine, diethylenetriamine, triethylene-tetramine, tetraethylenepentamine and triaminoethylamine.

7. The method of claim 6 wherein the diaryl compound:aldehyde ratio is from about 1:2 to about 1:4, the diaryl compound:catalyst molar ratio is from about 1:0.5 to about 1:0.2 and the temperature employed is from about 100° C. to about reflux.

8. The method of claim 7 wherein said diaryl compound is diphenyl oxide, said aldehyde is para-formaldehyde, said saturated monocarboxylic acid is acetic acid, said strong acid catalyst is p-toluene sulfonic acid and said amino compound is tetraethylene pentamine.

* * * * *